No. 895,305. PATENTED AUG. 4, 1908.
H. M. RUSSELL, Jr.
MECHANICAL MOVEMENT.
APPLICATION FILED APR. 13, 1908.

2 SHEETS—SHEET 1.

WITNESSES:
Maria L. Holliday.
Morgan O. Heiskell

INVENTOR.
Henry M. Russell Jr.

No. 895,305. PATENTED AUG. 4, 1908.
H. M. RUSSELL, Jr.
MECHANICAL MOVEMENT.
APPLICATION FILED APR. 13, 1908.

2 SHEETS—SHEET 2.

WITNESSES:
INVENTOR.

UNITED STATES PATENT OFFICE.

HENRY M. RUSSELL, JR., OF WHEELING, WEST VIRGINIA.

MECHANICAL MOVEMENT.

No. 895,305.      Specification of Letters Patent.      Patented Aug. 4, 1908.

Application filed April 13, 1908. Serial No. 426,744.

To all whom it may concern:

Be it known that I, HENRY M. RUSSELL, Jr., of Wheeling, Ohio county, West Virginia, have invented a new and useful Improvement in Mechanical Movements, of which the following is a full, clear, and exact description, reference being had to the accompanying drawings, forming part of this specification, in which—

Figure 1:
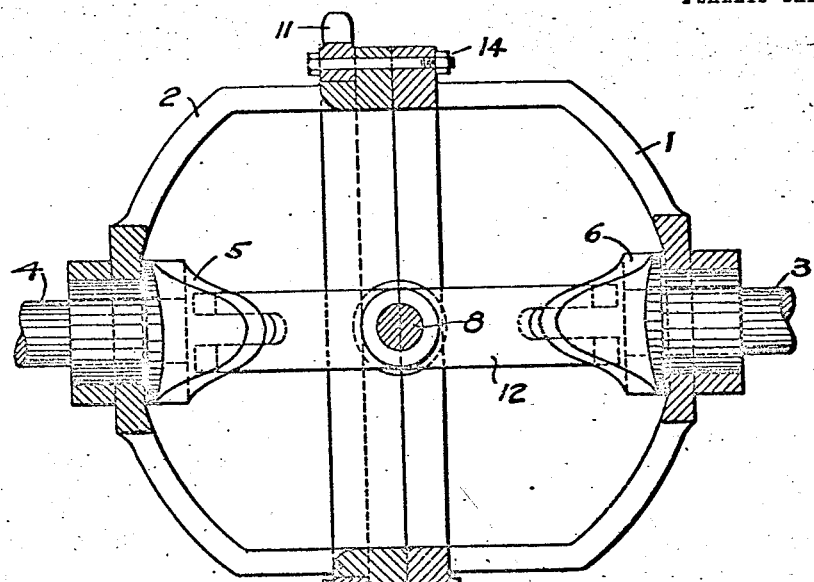
Figure 2:
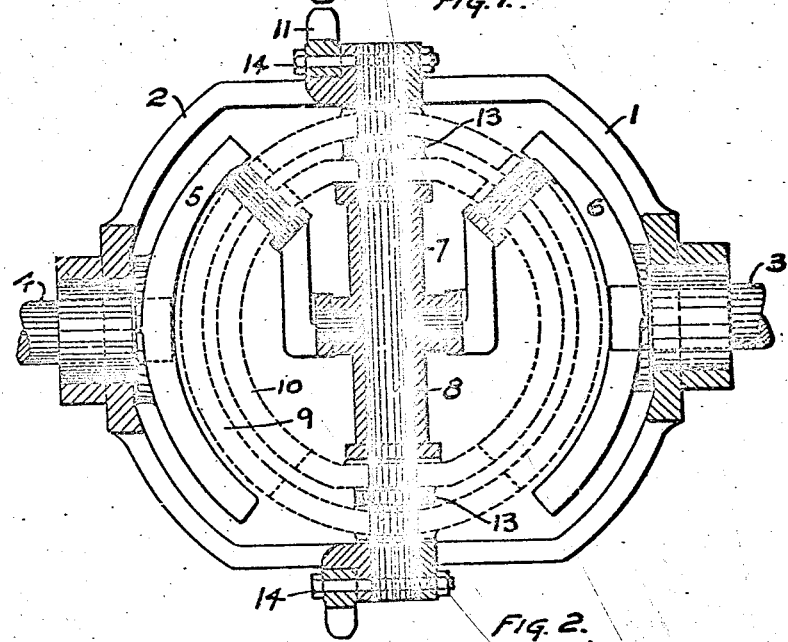
Figure 3:
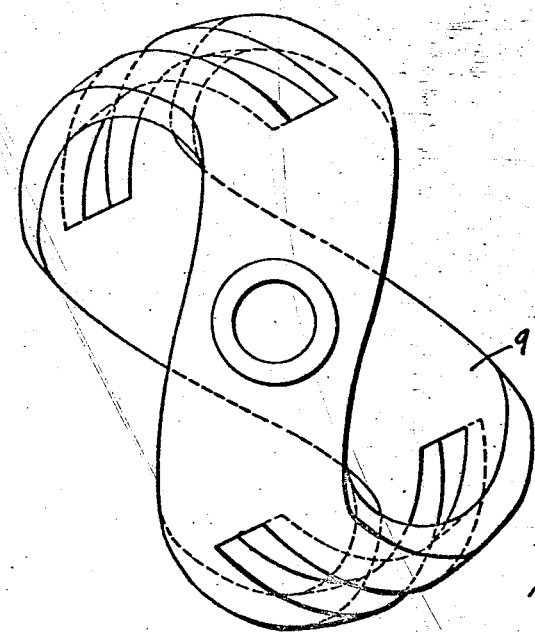
Figure 4:
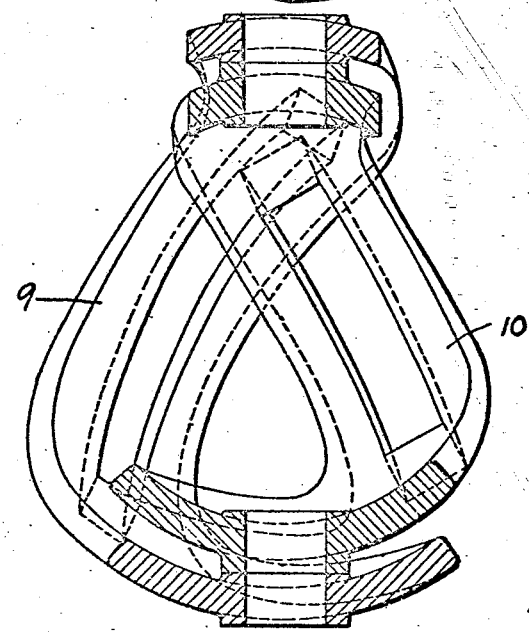

Figure 1 is a plan partly in section of an elementary form of device embodying my invention, Fig. 2 is an elevation partly in section of a more complex device embodying my invention. In Fig. 2 two of the members are merely indicated by dotted lines to avoid confusion. Fig. 3 is a top view of one of the members indicated by dotted lines in Fig. 2. Fig. 4 is a cross section of both of the said members.

My invention has relation to mechanical movements employed for various purposes and especially to those used as equalizing or balance gears in motor cars and also to mechanical movements used for the transmission of power from engines to other machinery.

One object of my invention is to provide an equalizing gear which shall operate positively without the use of toothed gearing.

Another object of my invention is to provide a device capable of causing a driven shaft to rotate at a speed different from that of the driving shaft without employing toothed gears or friction contacts.

Another object of my invention is to provide a substitute for toothed gearing which shall operate with less jar, less noise and less liability to breakage than the latter.

My invention consists of three alined members differentially connected by conic link work, the said conic link work comprising rings pivoted to one of the said members and having slots in them adapted to engage the pins of cranks connected with the other two of the said members.

Fig. 1 shows an elementary form of the device partly in section. A cage or housing made up of opposite halves 1 and 2 held together by bolts 14 which also hold in place the sprocket 11 has bearings at opposite sides for the shafts of the cranks 5 and 6. The cranks are seen more clearly in Fig. 2. A bearing member 7 supports the ends of 5 and 6. The cage has a central pin 8 upon which the ring 12 may oscillate. This ring 12 has in its sides slots whose centers lie in a plane passing through the center line of the pin 8. The crank pins of 5 and 6 pass through these slots. The pins of the cranks 5 and 6 are so placed that their center lines pass through the center of the device, that is through the intersection of the main axis of 5 and 6 with the center line of the pin 8. Since the center planes of the slots also pass through the center of the device, it is plain that the mechanism will be movable and that the crank pins if they fit the slots in one position must fit them in any position which the cranks can occupy. It is also clear since the device is symmetrical that the cranks, if they move at all, must have equal and opposite movements. Assume the cage to be stationary and the crank 6 to turn toward the top of the figure; this will tilt the ring 12 out of its horizontal plane and the opposite side of the ring 12 will push the crank 5 down through the same angle as that through which the crank 6 has moved but in the opposite direction. This shows that we have a perfect differential action.

It will be seen that when crank 6 has turned through 90° the crank 5 will have turned 90° in the opposite direction and the cranks will be opposite. In this position the ring 12 is at the limit of its oscillation and can transmit no power. The device is therefore on a dead center. This may be overcome by using four cranks and two rings similar to 12 but set at right angles to each other. I prefer the arrangement shown in Figs. 2, 3 and 4 which illustrate the device in its complete practical form. Only two cranks are employed but two rings 9 and 10 are used instead of the single ring 12. Fig. 2 shows the complete device, except that the dotted lines merely indicate the general positions that would be occupied by the rings. Washers 13 separate 9 and 10. Fig. 3 shows a top view of the ring 9 and it will be seen that the slots instead of being parallel to the axis of the oscillation of the ring are turned at an angle of 30° to this axis. The effect of this is to make the dead center come when the cranks are 90 degrees apart instead of when they are opposite. Fig. 4 is a cross-section of both rings 9 and 10 and shows the relative positions of the slots in the two rings. For clearness washers are not shown in Figs. 3 and 4. It will be seen that the slots in one ring are placed somewhat like the threads on a double thread right-handed screw, while those in the other ring are placed like the threads on a left handed screw. The effect of this is to make the dead centers of the two systems come ninety degrees apart and so to produce continuous rotation. This may be clearly seen by remembering that the dead center occurs when the ring has reached the limit of its oscillation. The different positions of the slots makes this occur at different times with the two rings and it may be shown that with the slots tilted 30 degrees the dead centers are just 90 degrees apart.

It is to be understood that the linkage may be connected in various ways and that various changes may be made in the structural details without departing from the principle of the invention. It will also be seen that the motion of the cranks in the slots is such that bushings might be used having flat sides to give a large bearing surface against the sides of the slots.

What I claim is:

1. In a mechanical improvement the combination of three alined revoluble members and conic link work differentially connecting the said members, the said conic link work comprising slotted rings and cranks sliding in the slots in the said rings.

2. In a mechanical movement the combination of three alined revoluble members and mechanism connecting them differentially, the said mechanism consisting of conic link work and slot and pin movements in combination, substantially as described.

3. In a mechanical movement the combination of three alined revoluble members, cranks attached to two of the said members, pins on the said cranks so placed that their center lines produced shall intersect the axis of the said members at the same point and shall make equal angles therewith and a ring connected with the third of the said members so that it may turn about an axis perpendicular to the main axis of the device at the point where the said center lines intersect the last named axis and having slots in its opposite sides adapted to engage the pins of the said cranks, substantially as described.

4. In a mechanical movement the combination of two cranks alined with each other and a third member alined with the said cranks; pins on the said cranks making angles of 45° with the said axis, a pin connected with the said third member making an angle of 90° with the said axis, the center lines of all the pins intersecting the said axis at a common point two concentric rings having their centers at the last mentioned point of intersection and turning about the said pin on the third member and each ring having slots in its opposite side adapted to engage the pins on the said cranks, the said slots in each ring being symmetrical with respect to the said pin on the third member but not lying in a plane through that pin and the said slots in one ring being placed like the threads on a right-handed screw and those in the other ring like the threads on a left-handed screw, substantially as described.

5. In a mechanical movement the combination of three alined revoluble members and mechanism differentially connecting the said members, the said mechanism comprising cranks attached respectively to two of the said members one pin only on each of the said cranks and two systems of conic link work intermediate of the said pins and the said third member, the two systems being so constructed that their dead centers shall not be together.

6. In a mechanical movement the combination of three alined revoluble members pins rigidly fixed to the said members respectively in such positions that the center lines of all three of the said pins shall intersect the axis of the said members at the same point and that the center line of one of the said pins shall make an angle of 90° with the said axis and the center lines of the other two of the said pins shall make angles of 45° with the said axis; two rings having the shape of portions of spheres with their centers at the said point of intersection turning upon the said pin making an angle of 90° with the axis as a pivot and being connected with the said pins in such a manner that one of the said pins shall always be 90° away from a fixed point on the surface of one of the said spheres, which point shall be 60° from the pin perpendicular to the main axis and the other 45° pin shall always be 90° from a point 60° from the said perpendicular pin but on the opposite side thereof from the last mentioned point and the connections with the other of the said rings being reversed so that the dead centers shall not come together.

HENRY M. RUSSELL, Jr.

Witnesses:
MARIA L. HOLLIDAY,
MORGAN O. HEISKELL.